United States Patent
Robens

(10) Patent No.: US 7,240,909 B2
(45) Date of Patent: Jul. 10, 2007

(54) TELESCOPING HANDLE FOR PAINT CART

(75) Inventor: Wayne Robens, Lakeville, MN (US)

(73) Assignee: Wagner Spray Tech Corporation, Plymouth, MN (US)

( * ) Notice: Subject to any disclaimer, the term of this patent is extended or adjusted under 35 U.S.C. 154(b) by 0 days.

(21) Appl. No.: 11/145,104

(22) Filed: Jun. 3, 2005

(65) Prior Publication Data

US 2006/0273537 A1   Dec. 7, 2006

(51) Int. Cl.
    *B62B 1/00* (2006.01)
(52) U.S. Cl. .............................. 280/47.24; 280/47.315; 280/655
(58) Field of Classification Search ............. 280/47.24, 280/47.33, 47.315, 47.371, 655, 655.1, 645; 16/427, 429; 239/146, 745, 322; 285/377, 285/302, 303; D32/16
    See application file for complete search history.

(56) References Cited

U.S. PATENT DOCUMENTS

| | | | | |
|---|---|---|---|---|
| 3,380,097 | A | * | 4/1968 | Pharris ........................ 16/429 |
| 3,940,065 | A | * | 2/1976 | Ware et al. ................. 239/146 |
| 3,998,476 | A | * | 12/1976 | Kazmark, Sr. .............. 280/655 |
| 4,004,539 | A | * | 1/1977 | Wesson ...................... 294/19.1 |
| 4,238,074 | A | * | 12/1980 | Coons ........................ 239/745 |
| 4,284,287 | A | * | 8/1981 | Esposito .................. 280/655.1 |
| 4,354,689 | A | | 10/1982 | Perego |
| 4,524,484 | A | * | 6/1985 | Graham ........................ 16/429 |
| 4,793,646 | A | * | 12/1988 | Michaud, Jr. ................ 285/303 |
| 4,854,391 | A | * | 8/1989 | Johnson ........................ 16/429 |
| 4,922,577 | A | * | 5/1990 | Unger ........................ 16/429 |
| 5,167,306 | A | * | 12/1992 | Carrigan, Jr. ............. 190/18 A |
| 5,441,297 | A | * | 8/1995 | Krohn et al. ................ 280/655 |
| 5,553,350 | A | | 9/1996 | Chang |
| 5,590,891 | A | | 1/1997 | Kazmark |
| 5,678,843 | A | | 10/1997 | Liu |
| 5,732,443 | A | | 3/1998 | Kazmark, Jr. |
| 5,781,964 | A | | 7/1998 | Lin et al. |
| 5,836,601 | A | * | 11/1998 | Nelson ........................ 280/645 |
| 5,937,473 | A | * | 8/1999 | Lisowski .................. 15/236.08 |
| 5,951,078 | A | * | 9/1999 | Whitehead et al. ........ 294/54.5 |

(Continued)

FOREIGN PATENT DOCUMENTS

WO          9407731          4/1994

OTHER PUBLICATIONS

International Search Report and Written Opinion (both mailed May 7, 2007) for International Application Number PCT/US2006/020330, filed May 25, 2006.

*Primary Examiner*—Hau Phan
(74) *Attorney, Agent, or Firm*—Faegre & Benson LLP

(57) ABSTRACT

A paint pump cart having a telescoping handle assembly including a paint pump frame having a pair of standtubes, a handle having a pair of extensions received in the standtubes, and a pair of knobs mounted on the standtubes. Each knob is rotationally movable with respect to its standtube and has a pair of internal ramps. The handle assembly has a bushing supporting and retaining the knob while permitting movement of the knob on the standtube. A pair of resiliently mounted projections internal to the handle extensions are movable by the ramps of the knob between a locking position wherein the respective handle extension is maintained in an extended position with respect to the standtube, and a released position wherein the handle extension is allowed to telescope into the standtube towards a storage position.

8 Claims, 23 Drawing Sheets

U.S. PATENT DOCUMENTS

| | | | |
|---|---|---|---|
| 5,983,455 A * | 11/1999 | Polzin et al. | 16/429 |
| 6,027,128 A | 2/2000 | Stich | |
| 6,168,212 B1 * | 1/2001 | Finley | 285/377 |
| 6,182,983 B1 | 2/2001 | Kim | |
| 6,220,240 B1 * | 4/2001 | Grady et al. | 16/429 |
| D444,279 S * | 6/2001 | Kristiansen et al. | D34/12 |
| 6,279,838 B1 * | 8/2001 | Sivells et al. | 239/146 |
| D459,851 S * | 7/2002 | Rehkugler et al. | D34/24 |
| D463,888 S * | 10/2002 | Rehkugler et al. | D32/16 |
| 6,520,192 B1 * | 2/2003 | Lo | 248/188.5 |
| 6,651,992 B1 * | 11/2003 | Smith, Sr. | 280/47.315 |
| 6,935,642 B1 * | 8/2005 | Craig et al. | 280/47.24 |

* cited by examiner

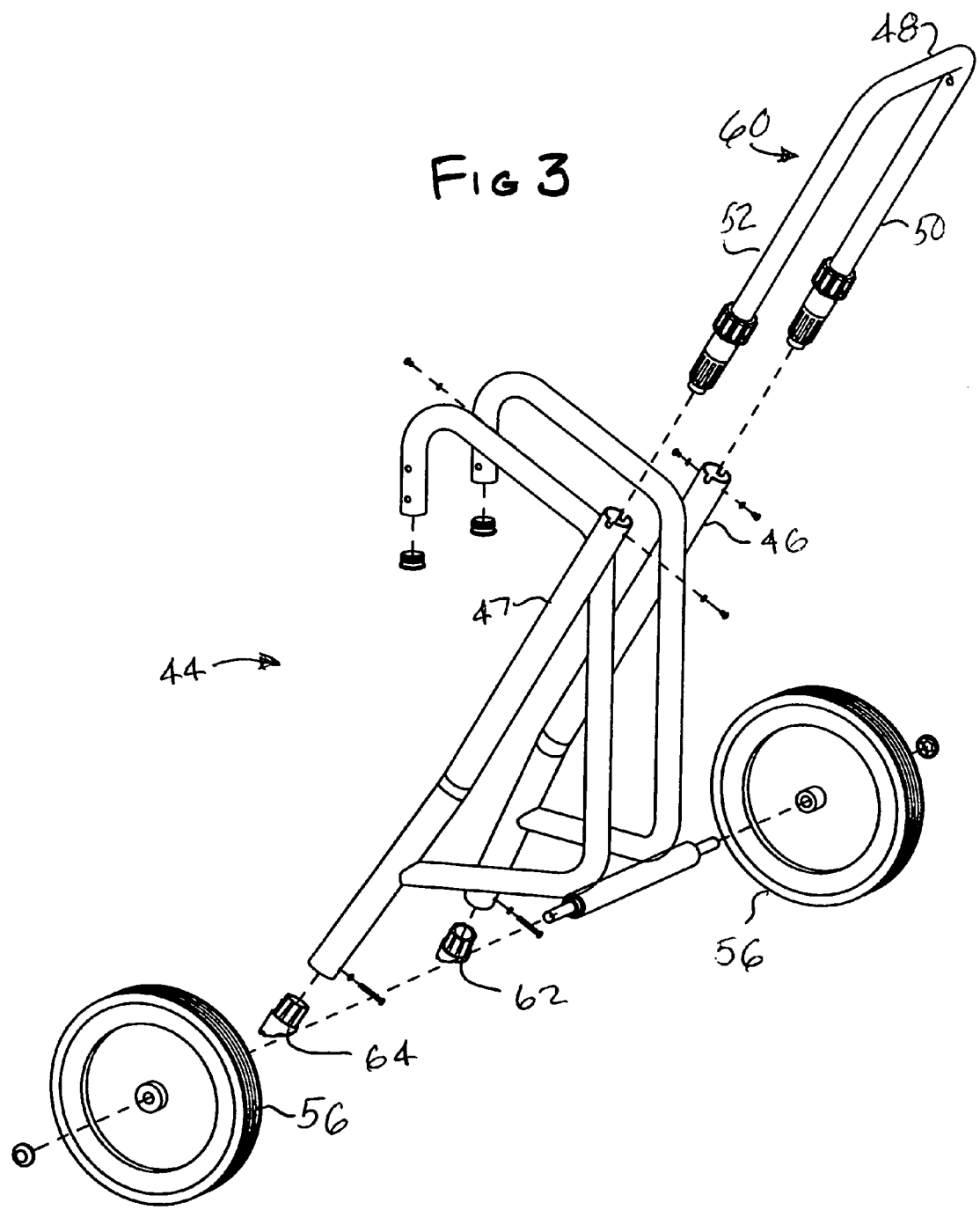

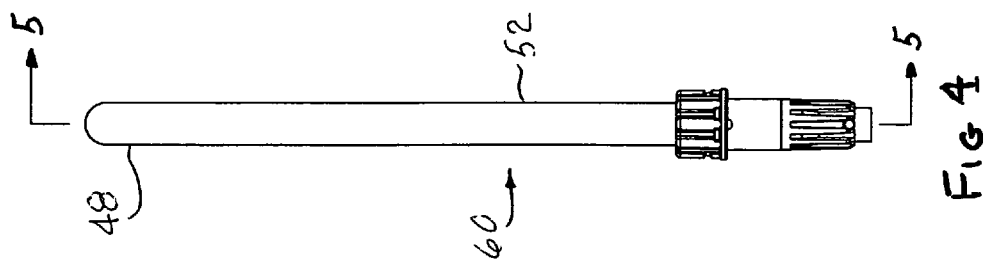
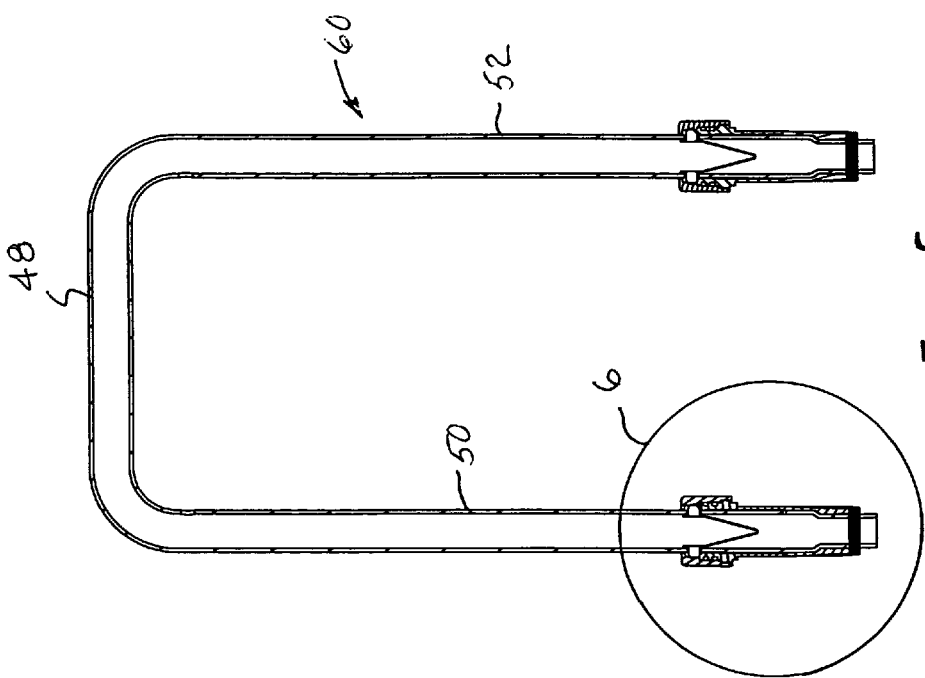

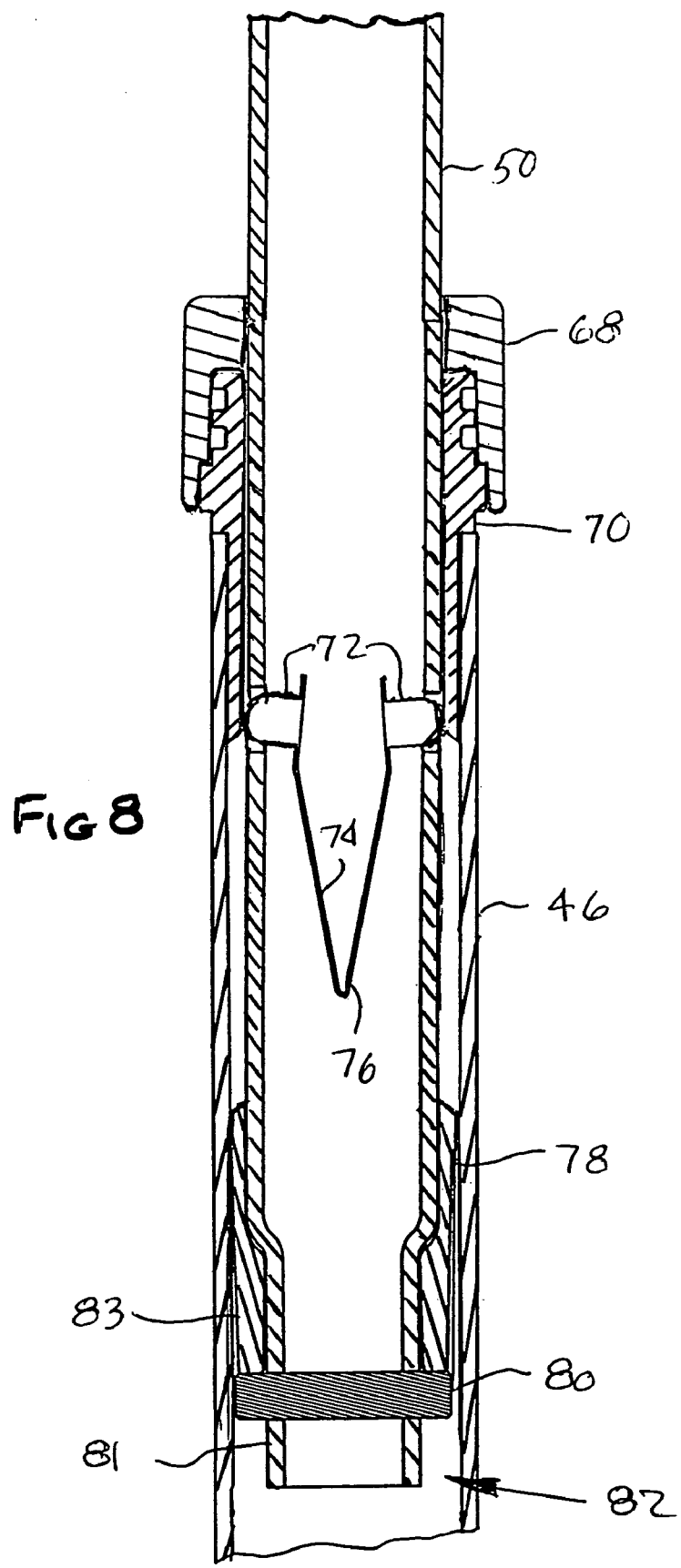

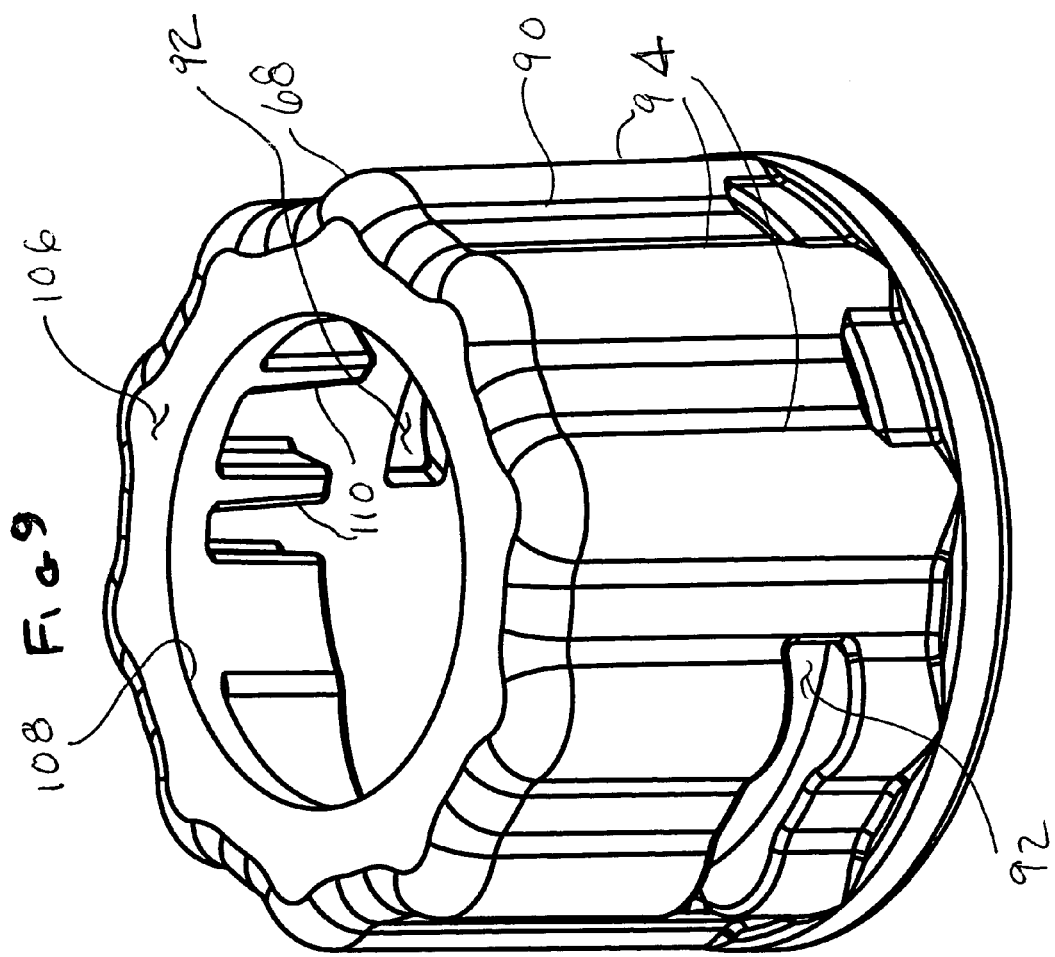

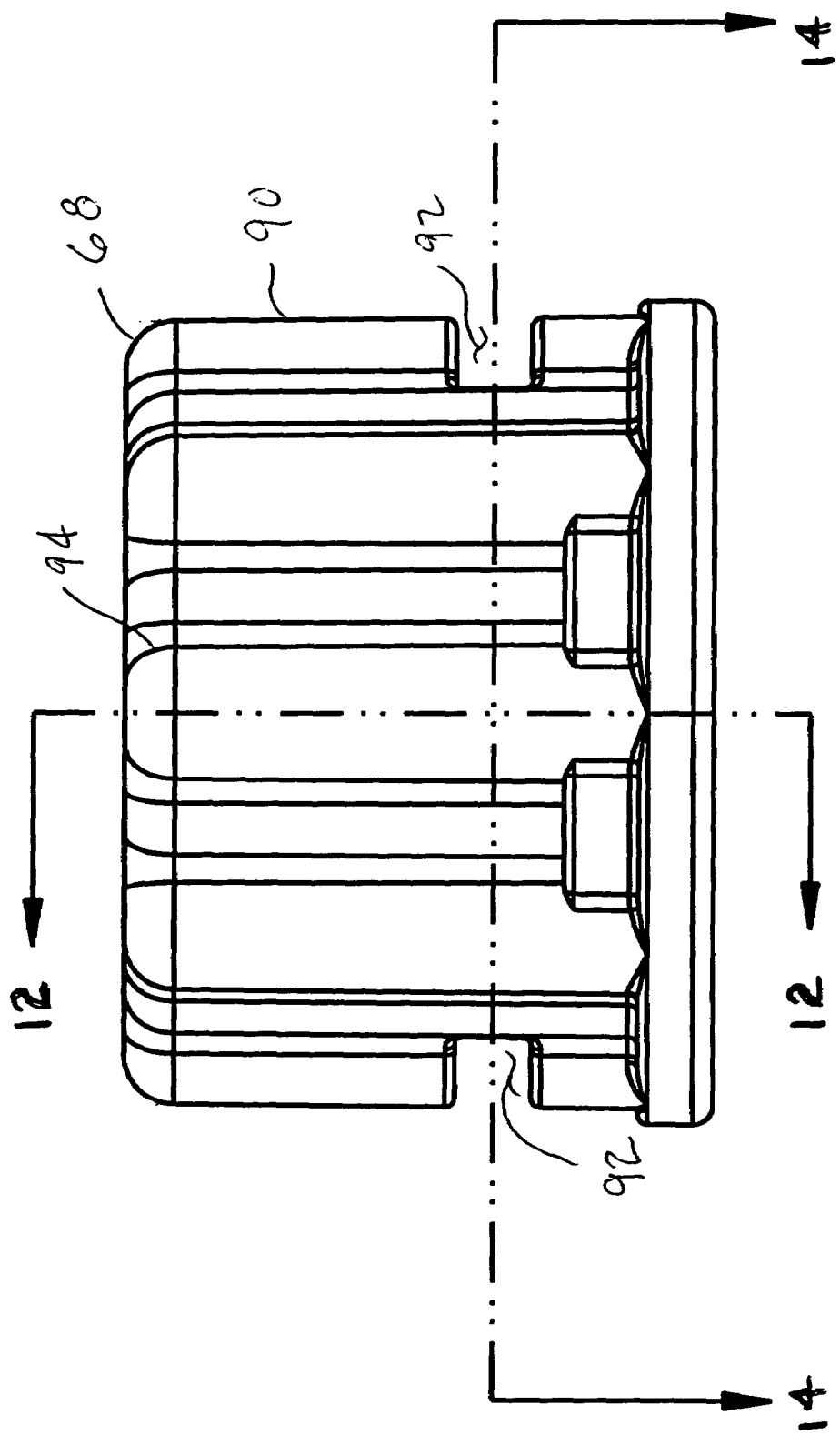

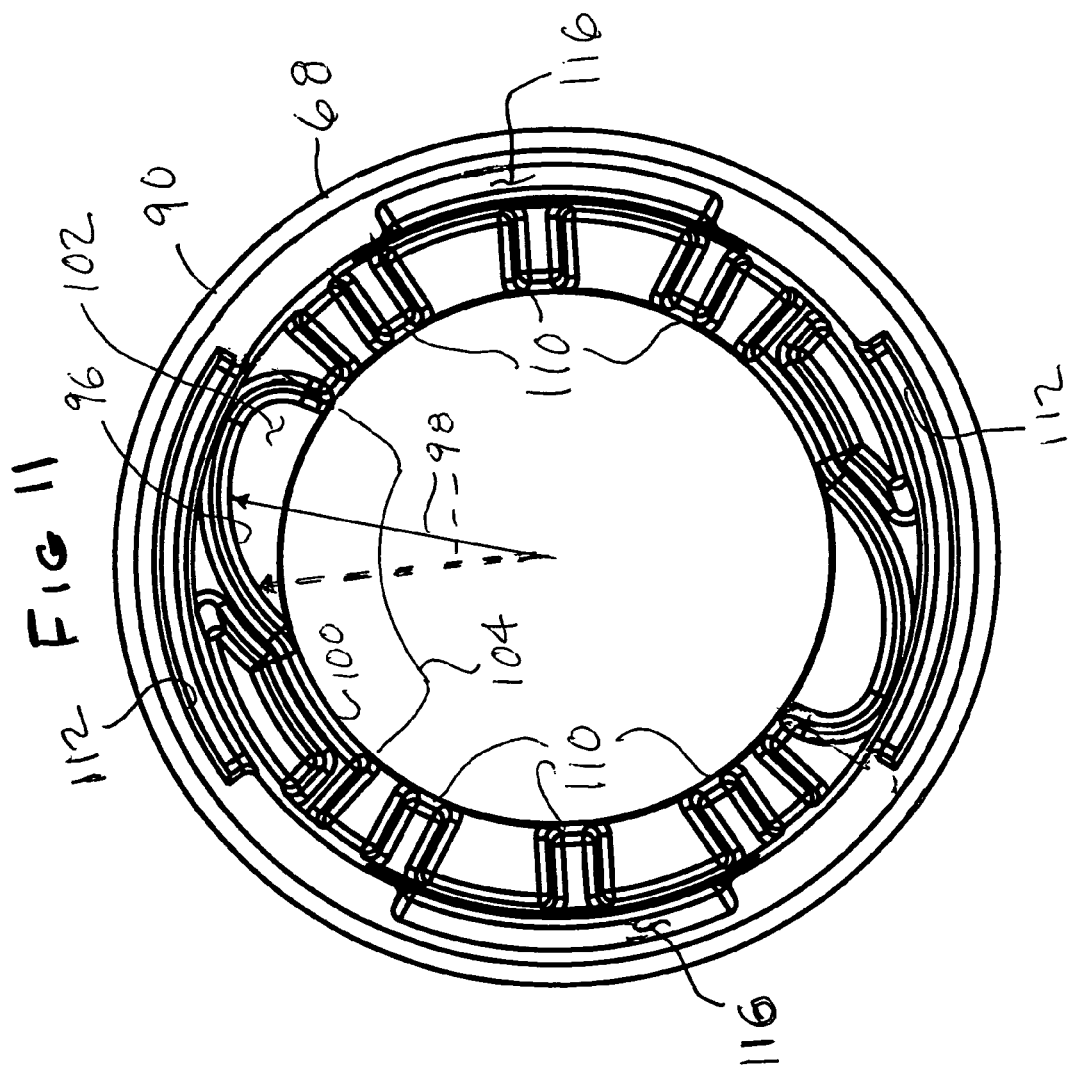

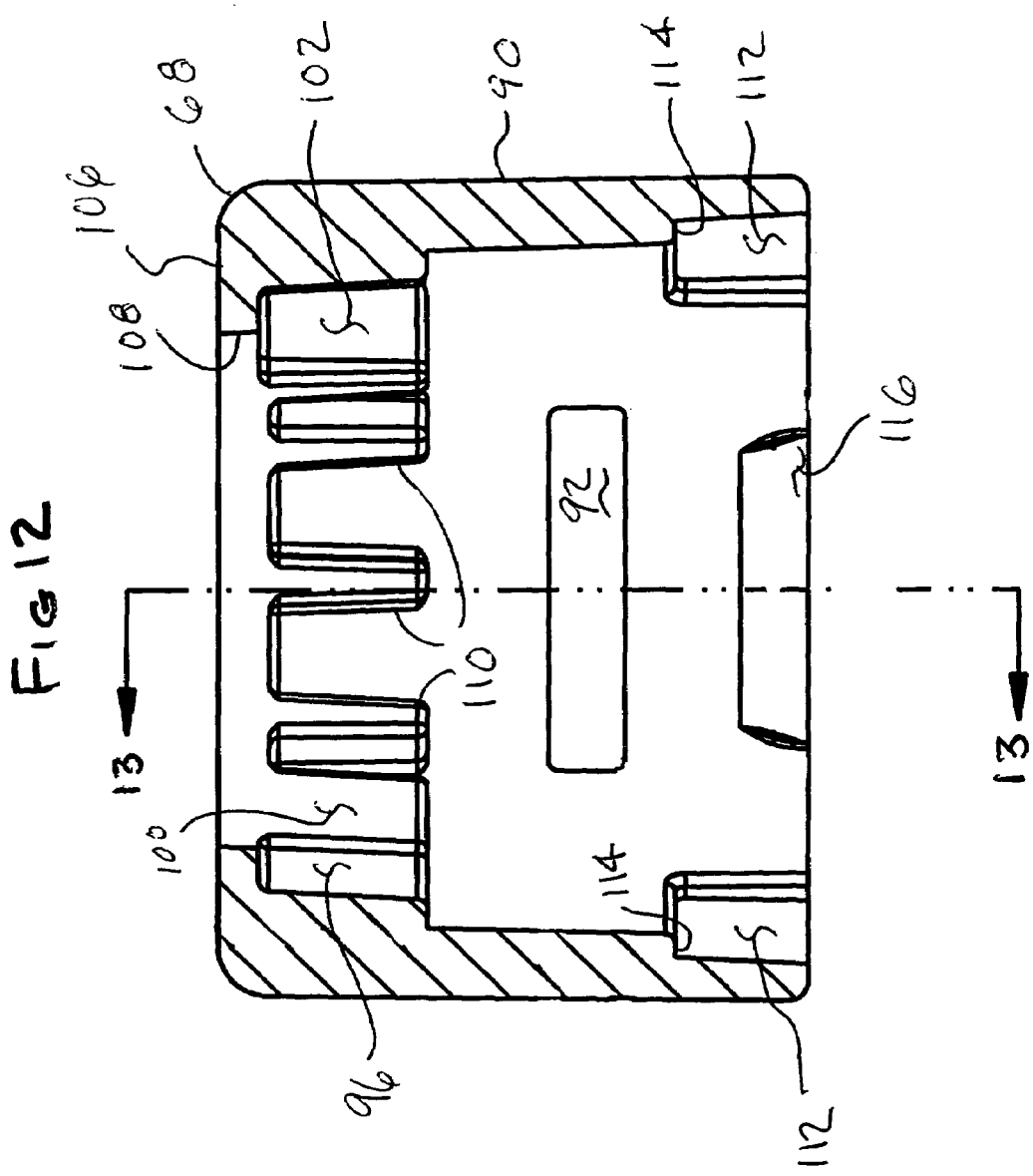

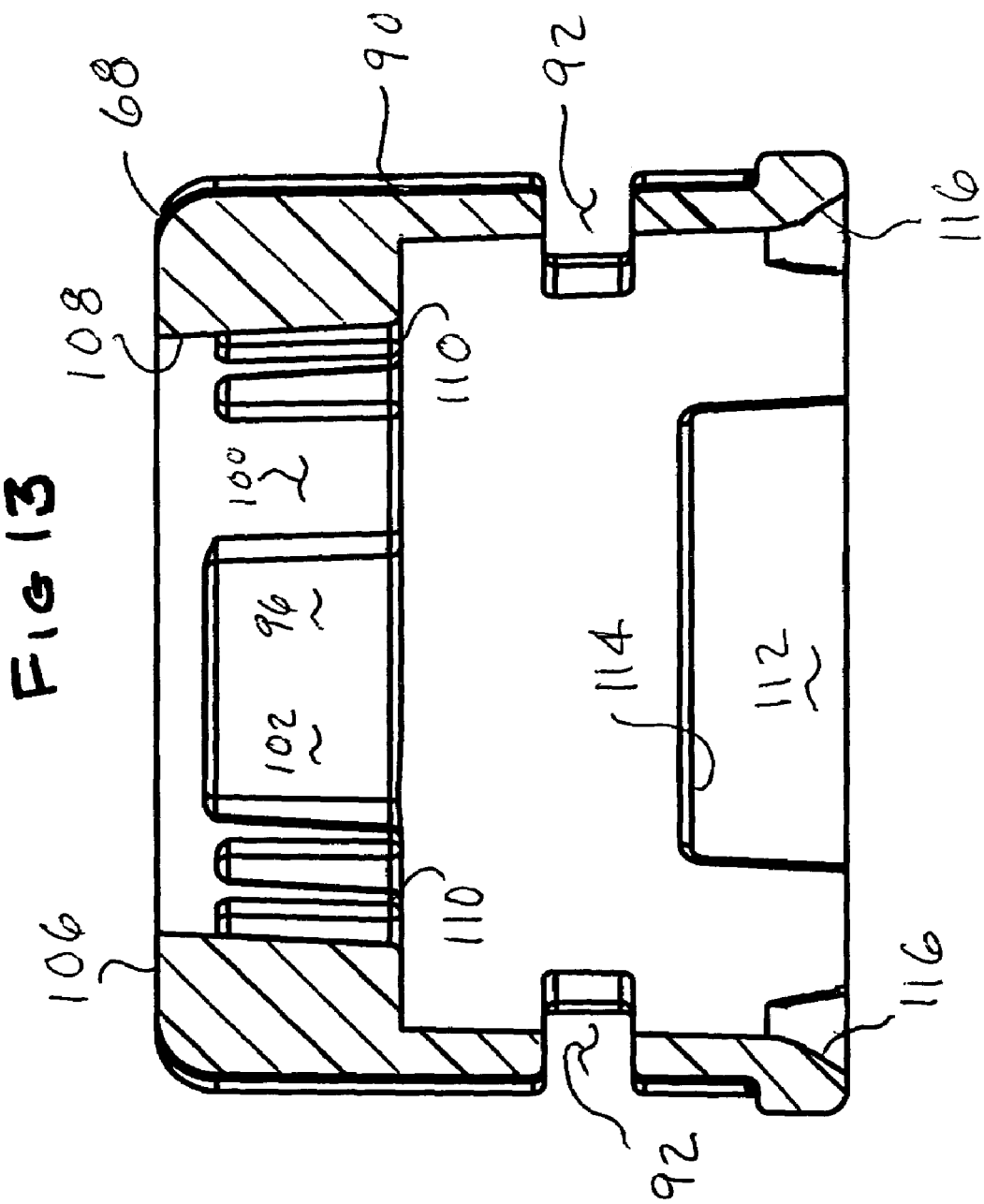

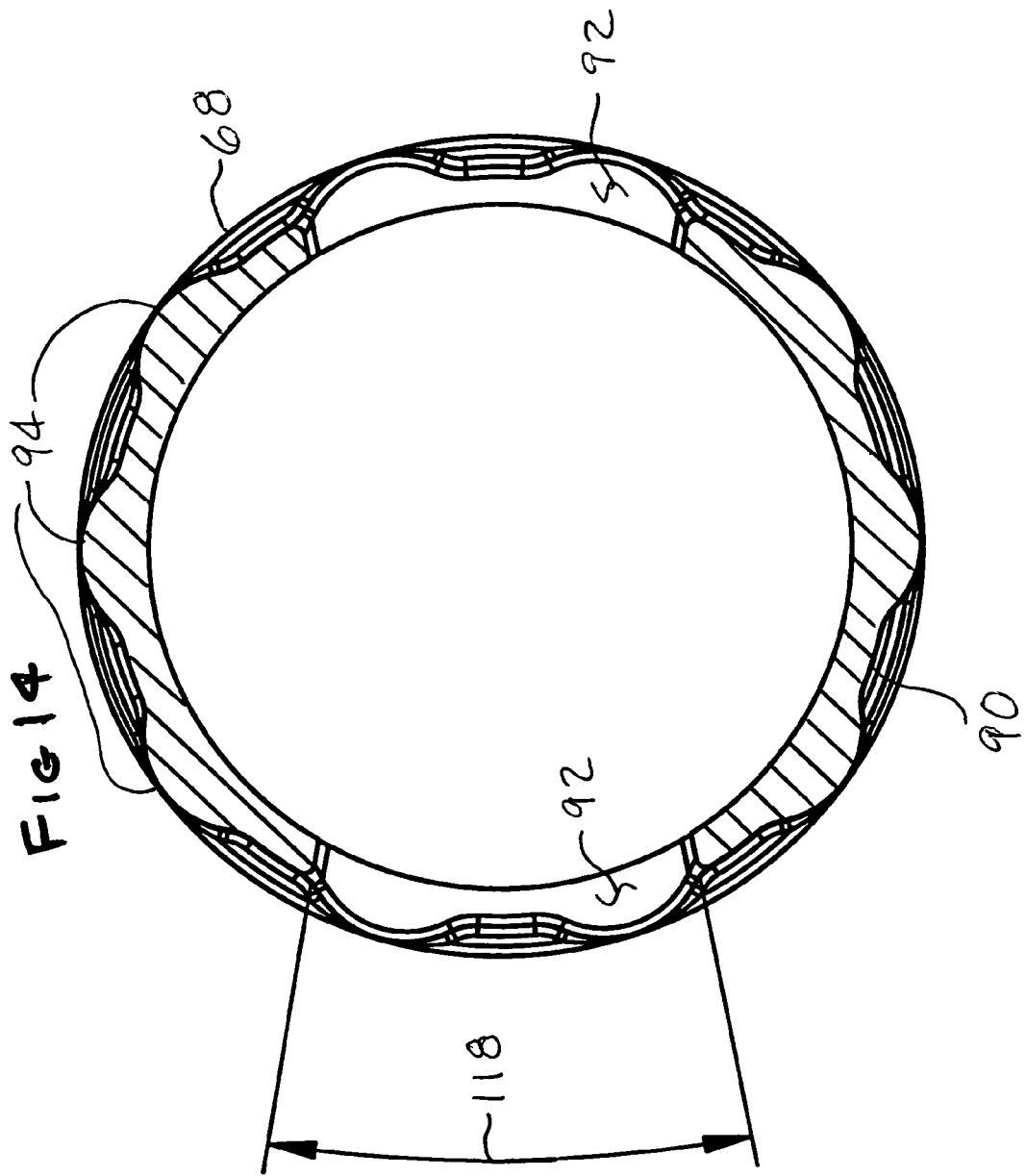

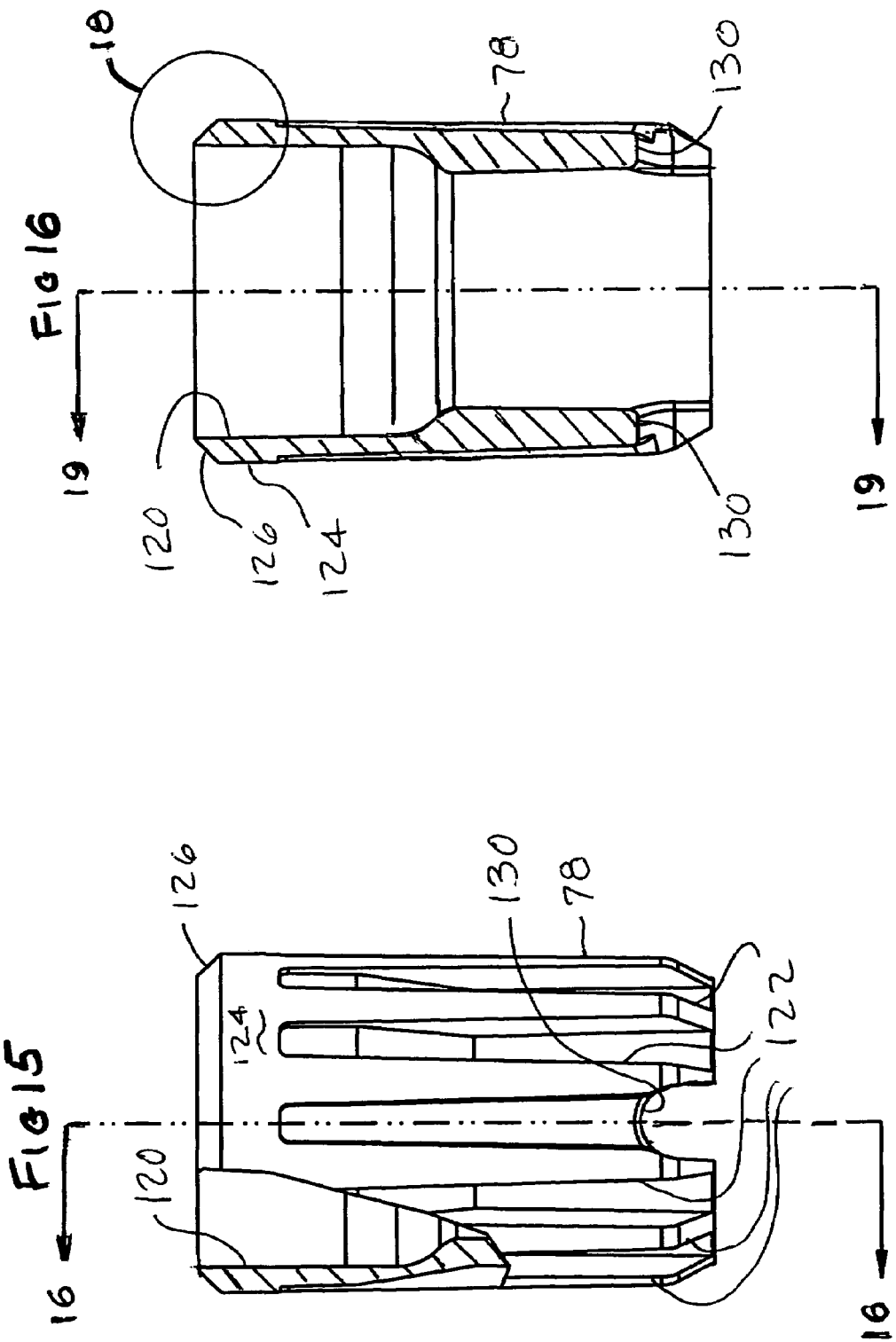

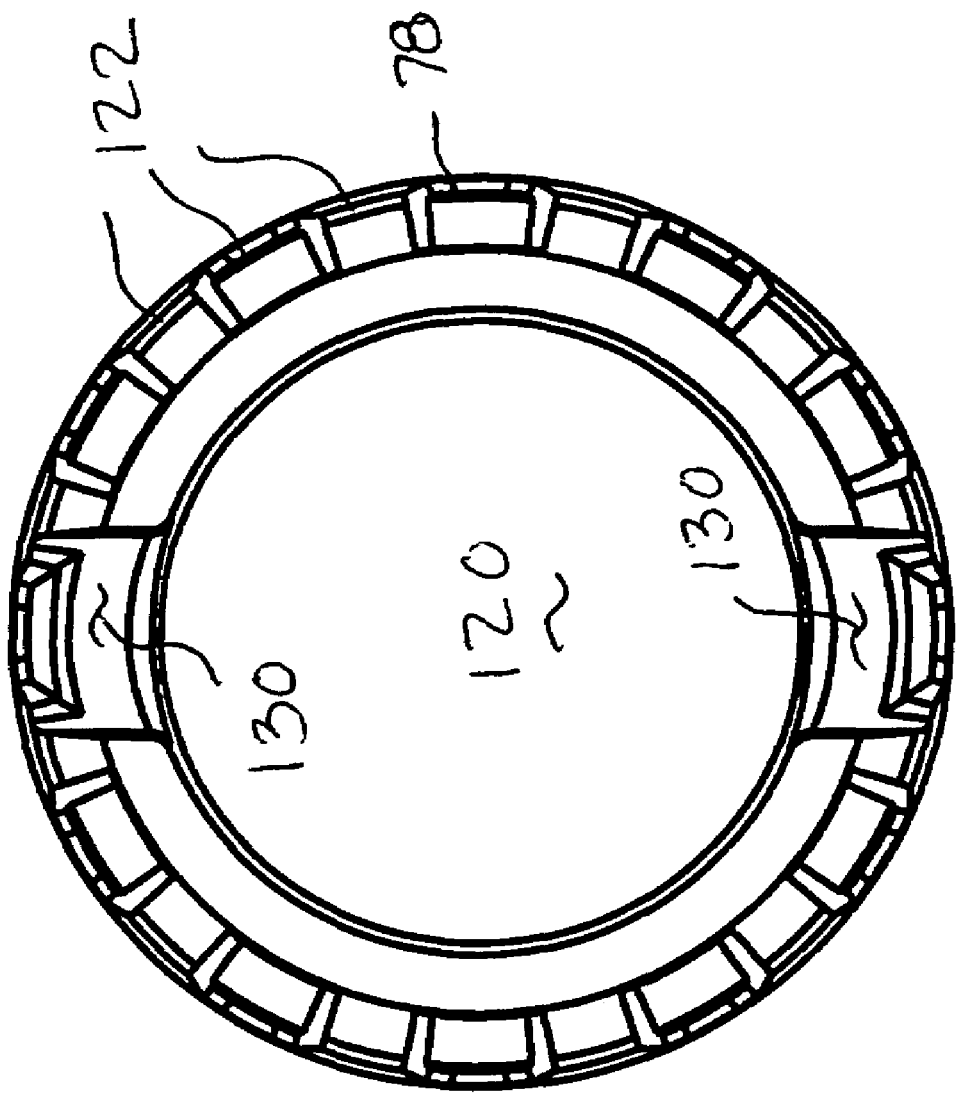

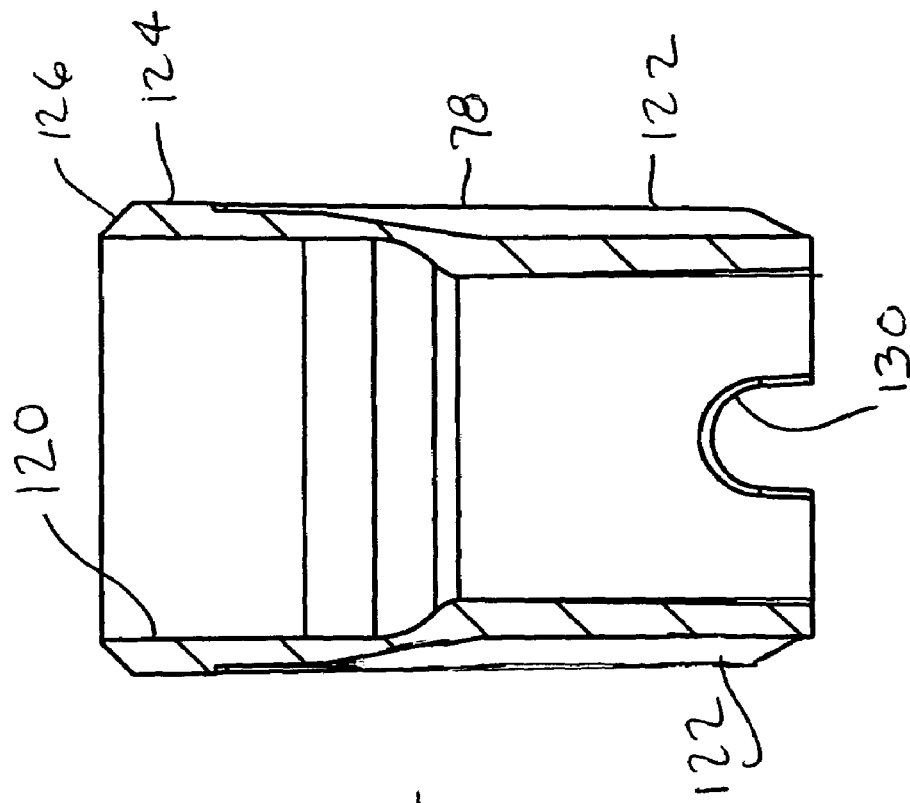
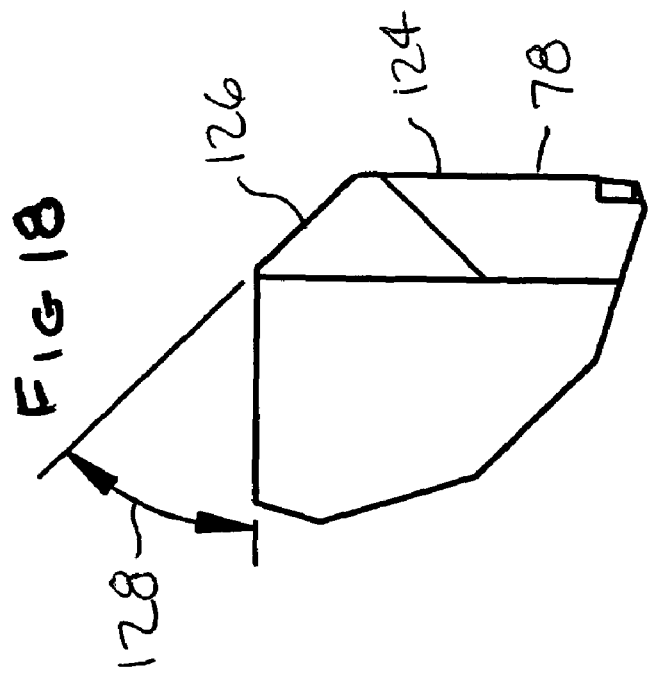

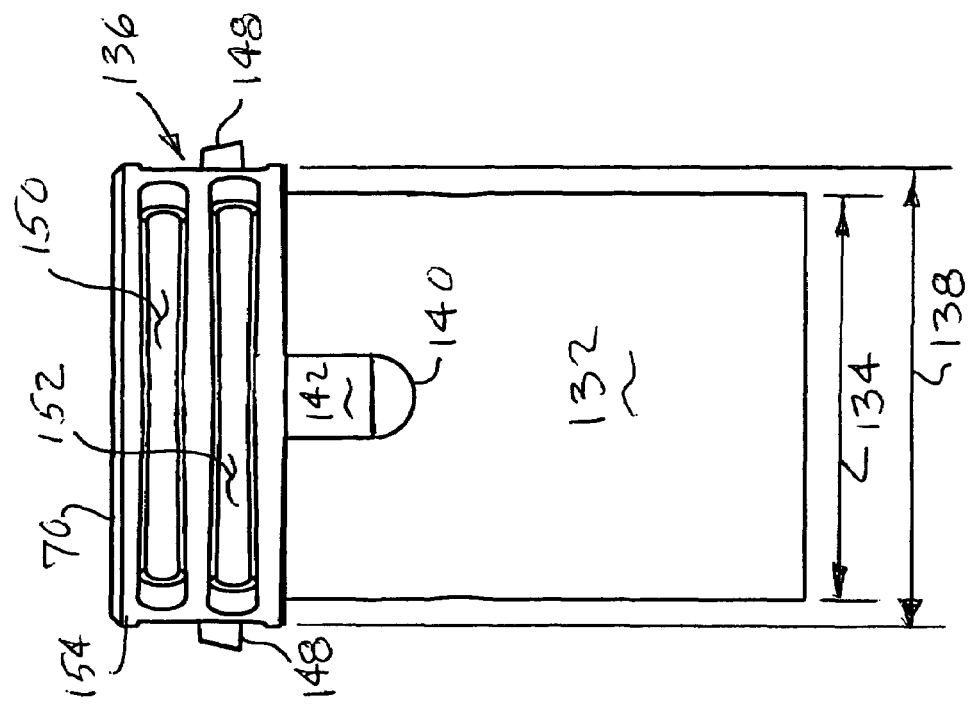
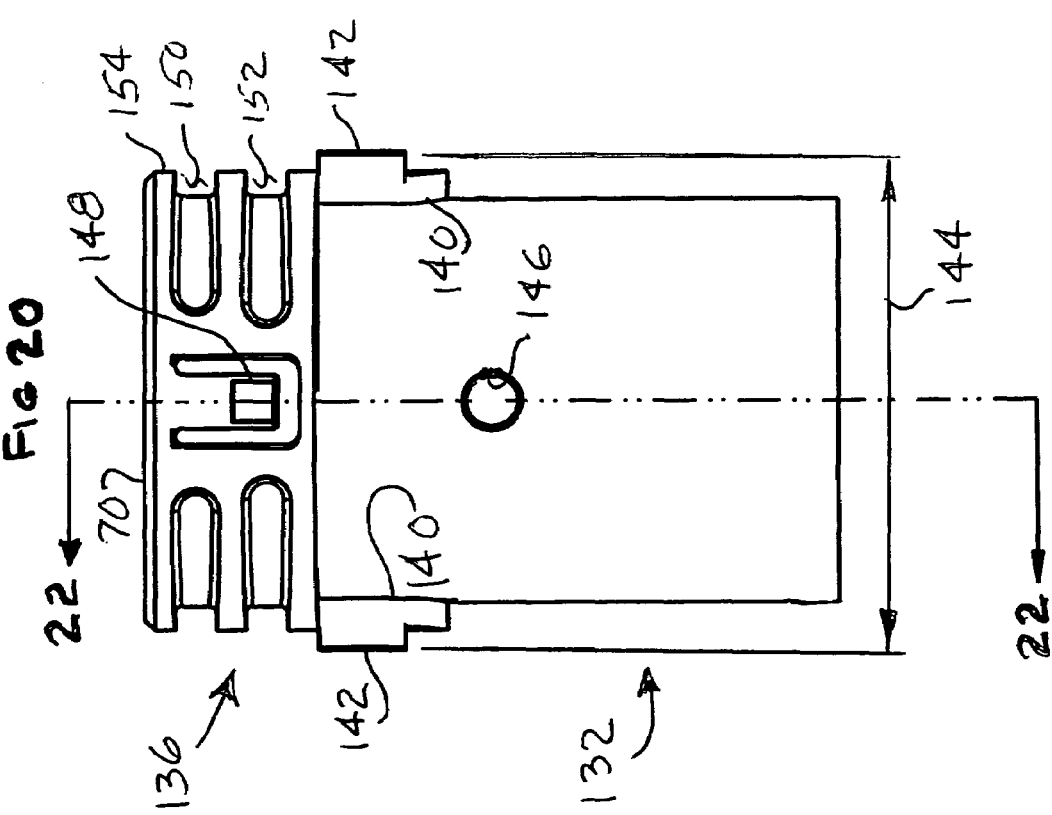

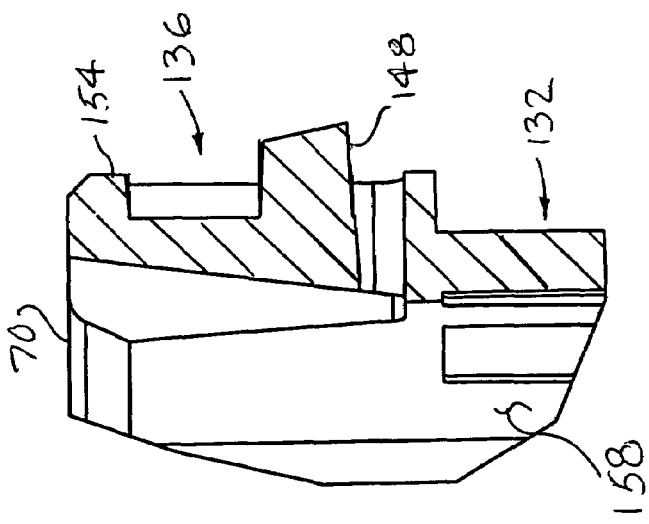
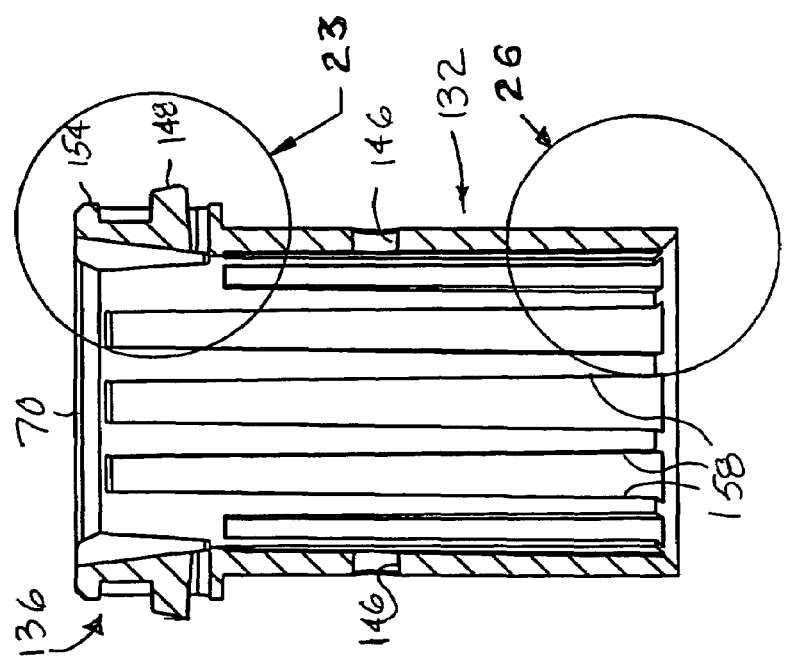

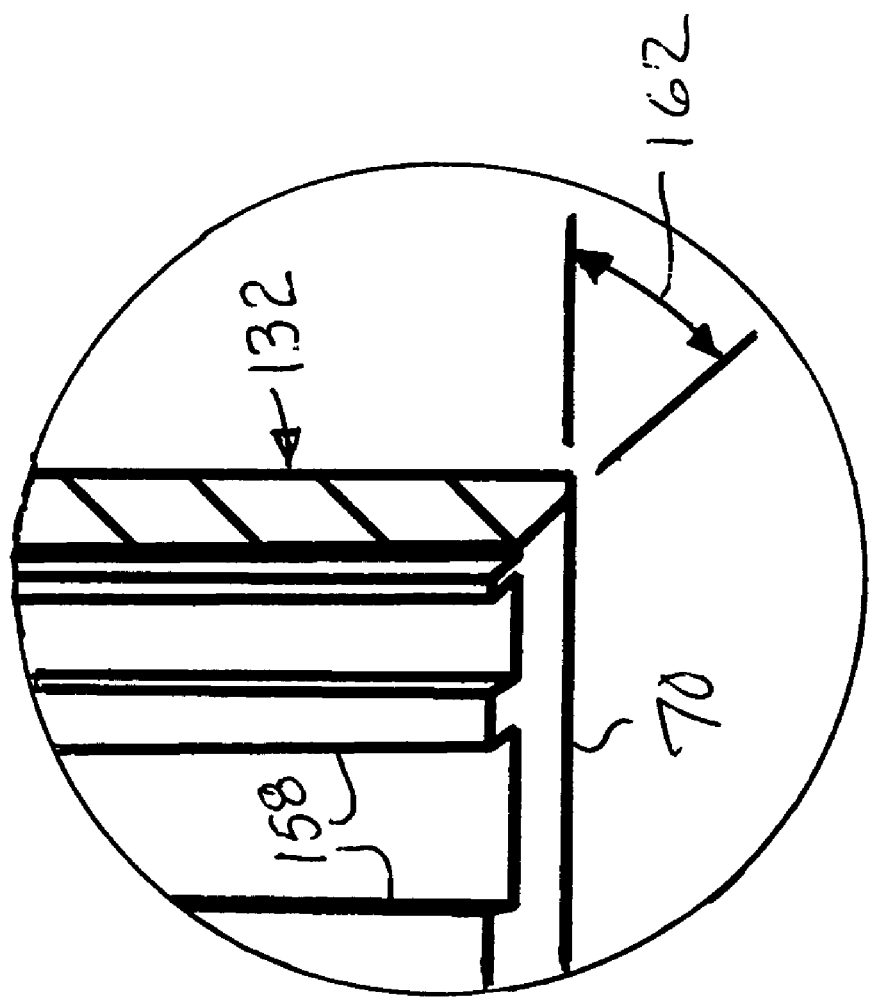

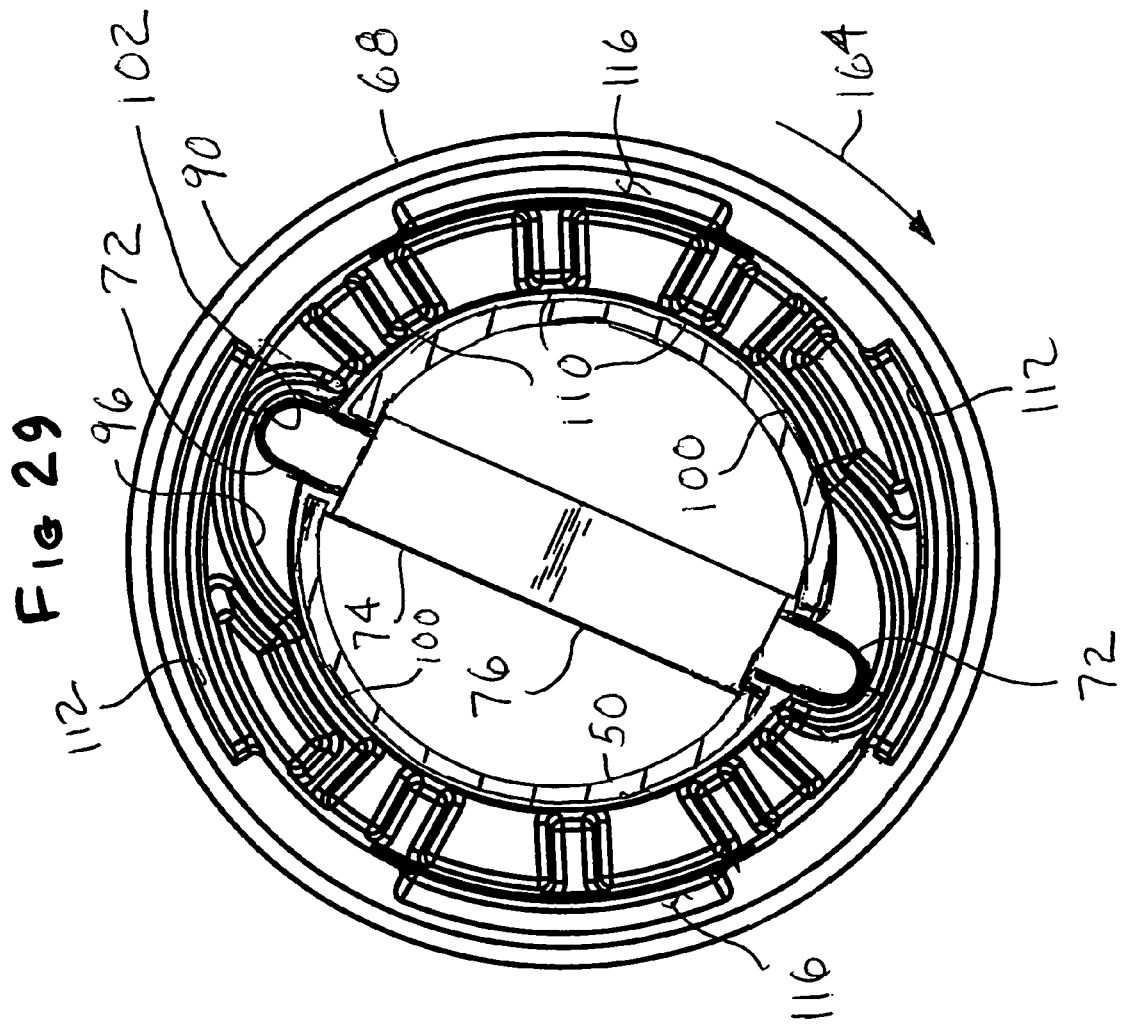

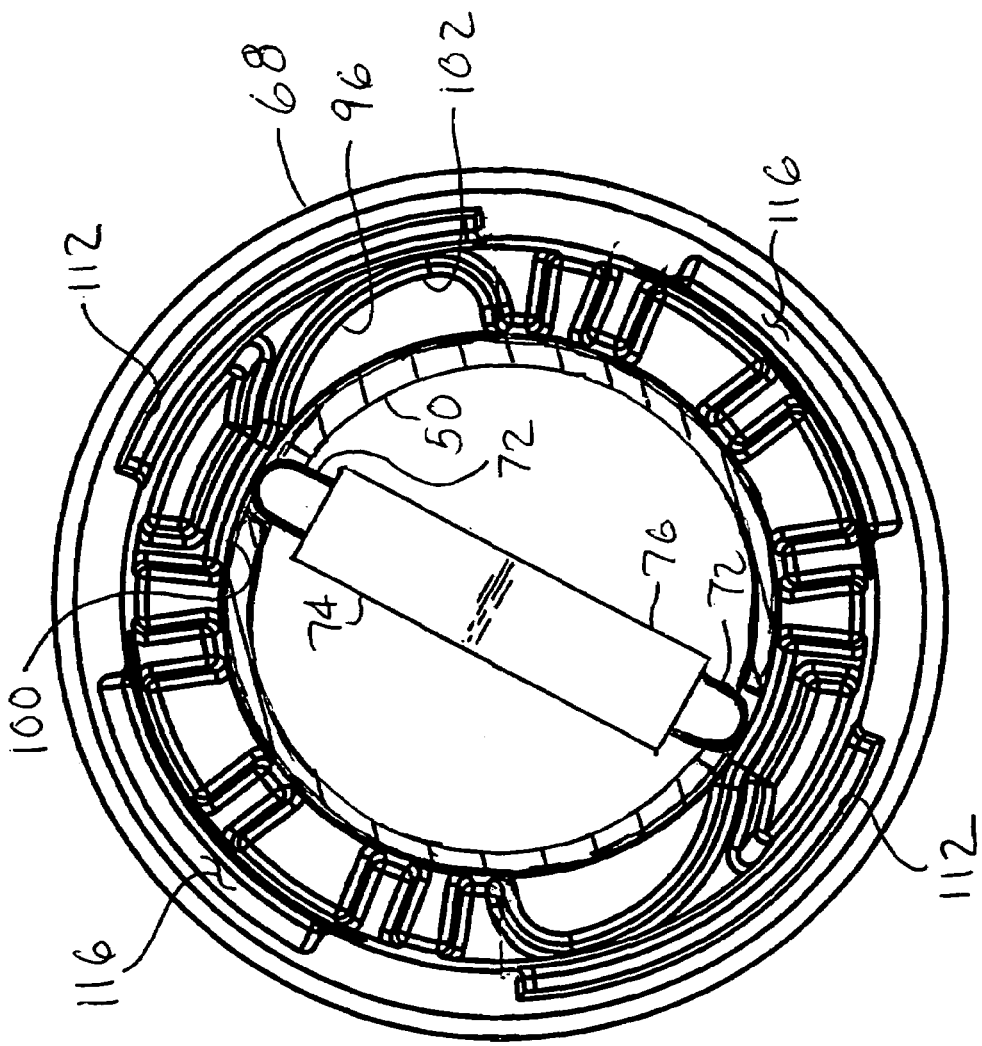

TELESCOPING HANDLE FOR PAINT CART

FIELD OF THE INVENTION

The present invention relates to the field of paint carts, more particularly, to an upright paint cart having handles for moving the cart.

BACKGROUND OF THE INVENTION

In the past, upright paint carts have had fixed handles for moving such carts as desired. While such handles have been convenient and popular, in such prior art carts the handle projects substantially above the height of a paint pump mounted on the cart. When it was desired to store or transport the cart, the height of the handle required additional clearance and made the cart somewhat awkward to store and transport, particularly if the overhead space for the cart was limited, as was often the case with attempting to transport the cart in a vehicle.

The present invention overcomes the disadvantage of a full-time, full height handle on a paint cart by providing a telescoping handle for the paint cart, which is readily movable between a storage position and an operating position without the use of tools. Additionally, the handle conveniently stores within the frame of the cart, and results in a substantial height reduction for the cart when the handle is in the storage position.

SUMMARY OF THE INVENTION

In one aspect the present invention includes a telescoping handle assembly for a paint pump cart having a paint pump frame having at least one upwardly projecting standtube; a handle having at least one downwardly projecting handle extension received in the standtube; a standtube knob at an intersection of the standtube and handle extension, the knob having at least a limited range of movement with respect to the standtube, and at least one internal ramp movable with respect to the handle extension; a standtube bushing supporting and retaining the standtube knob while permitting movement of the knob with respect to the standtube; and a resiliently mounted projection internal to the handle extension and movable between a locking position wherein the handle extension is maintained in an extended position with respect to the standtube, and a released position wherein the handle extension is allowed to telescope into the standtube towards a storage position wherein the internal ramp of the standtube knob moves the resiliently mounted projection between the locking position and the released position in response to the movement of the standtube knob with respect to the standtube.

BRIEF DESCRIPTION OF THE DRAWINGS

FIG. 3 is a partially exploded view of the cart of FIG. 2.

FIG. 4 is a side elevation view of a handle subassembly from FIG. 3 useful in the practice of the present invention.

FIG. 5 is a section view of the handle subassembly taken along line 5—5 of FIG. 4.

FIG. 8 is a view similar to that of FIG. 6, except with the handle released and partially telescoped towards the storage position.

FIG. 9 is an enlarged perspective view of a standtube knob from FIG. 7.

FIG. 10 is a side elevation view of the standtube knob of FIG. 9.

FIG. 11 is a bottom view of the standtube knob of FIG. 9.

FIG. 12 is a section view of the standtube knob taken along line 12—12 of Figure.

FIG. 13 is a section view of the standtube knob taken along line 13—13 of FIG. 12.

FIG. 14 is a section view of the standtube knob taken along line 14—14 of FIG. 10.

FIG. 15 is a partially cutaway enlarged side elevation view of a handle bushing of FIG. 7.

FIG. 16 is a section view of the handle bushing taken along line 16—16 of FIG. 15.

FIG. 17 is a bottom view of the handle bushing of FIG. 14.

FIG. 18 is an enlarged view of the detail 18 of FIG. 15.

FIG. 19 is a section view of the handle bushing taken along line 19—19 of FIG. 16.

FIG. 20 is an enlarged first side elevation view of a standtube bushing from FIG. 7.

FIG. 21 is a second side elevation view of the standtube bushing of FIG. 20 rotated 90 degrees.

FIG. 22 is a section view of the standtube bushing taken along line 22—22 of FIG. 20.

FIG. 23 is an enlarged view of detail 23 of FIG. 22.

FIG. 26 is an enlarged view of detail 26 of FIG. 22.

FIG. 29 is a simplified plan view of the standtube knob, with the handle in section showing the detent clip of FIG. 7 in a locked condition corresponding to the operating position.

FIG. 30 is a simplified plan view similar to that of FIG. 29, except showing the standtube knob and the detent clip in an unlocked condition.

DETAILED DESCRIPTION

Figure 1:
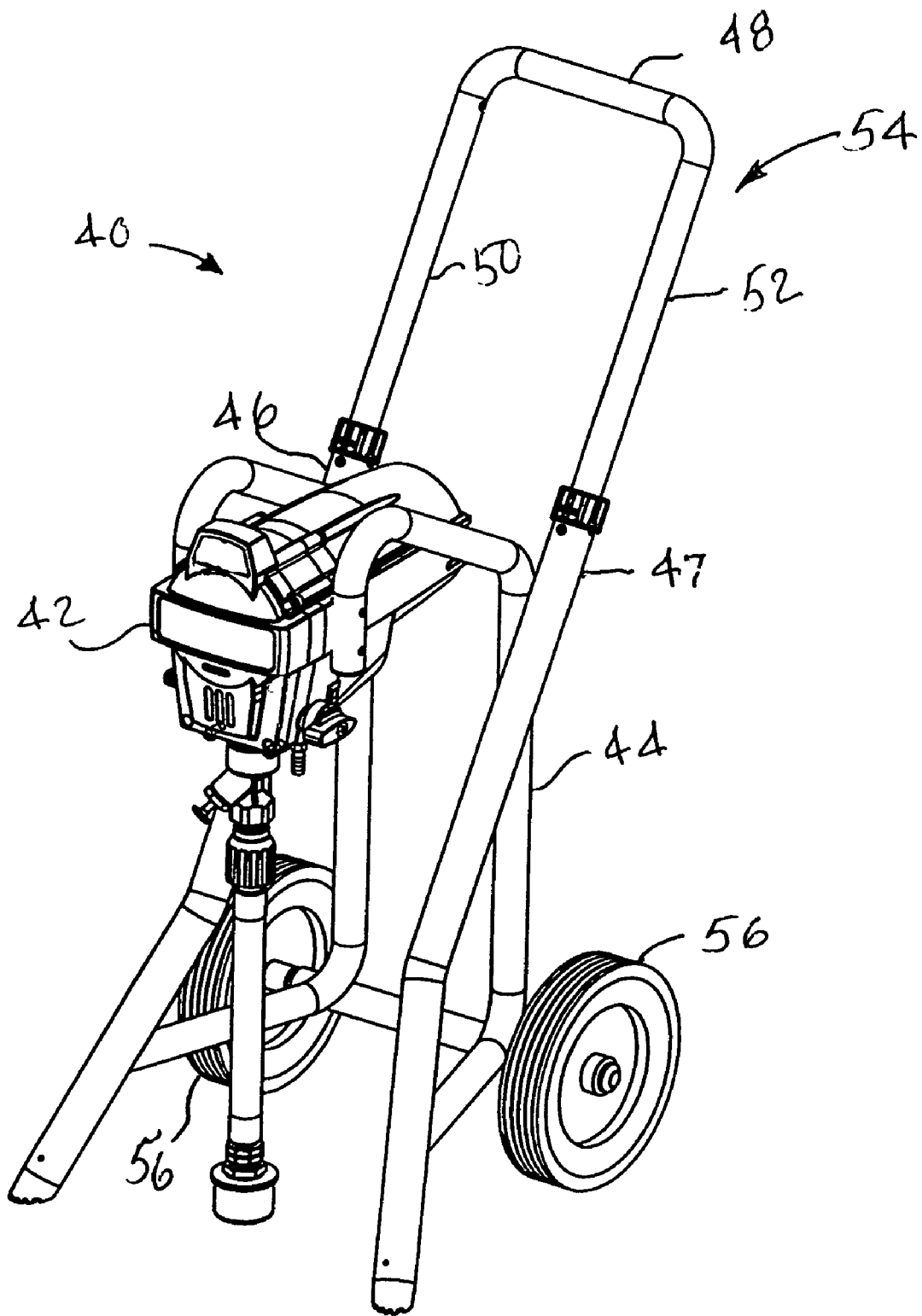
FIG. 1 is a perspective view of a paint pump and cart assembly according to the present invention with the handle extended to an operating position.

Referring to the Figures, and most particularly to FIG. 1, a paint pump and cart assembly 40 useful in the practice of the present invention may be seen. Assembly 40 includes a piston type paint pump 42, although the present invention is to be understood as being useful with other types of paint pumps. Cart 44 has a pair of upwardly projecting standtubes 46a, 46b and a handle 48 with a pair of downwardly projecting extensions 50, 52. Extensions 50, 52 are respectively received in standtubes 46, 47. As shown in FIG. 1, the handle 48 is in an operating position 54 in which the pump and cart assembly 40 may be moved from place to place by grasping the handle 48, rocking the assembly 40 back such that it is solely supported on a pair of wheels 56, and propelled and steered via handle 48.

Figure 2:
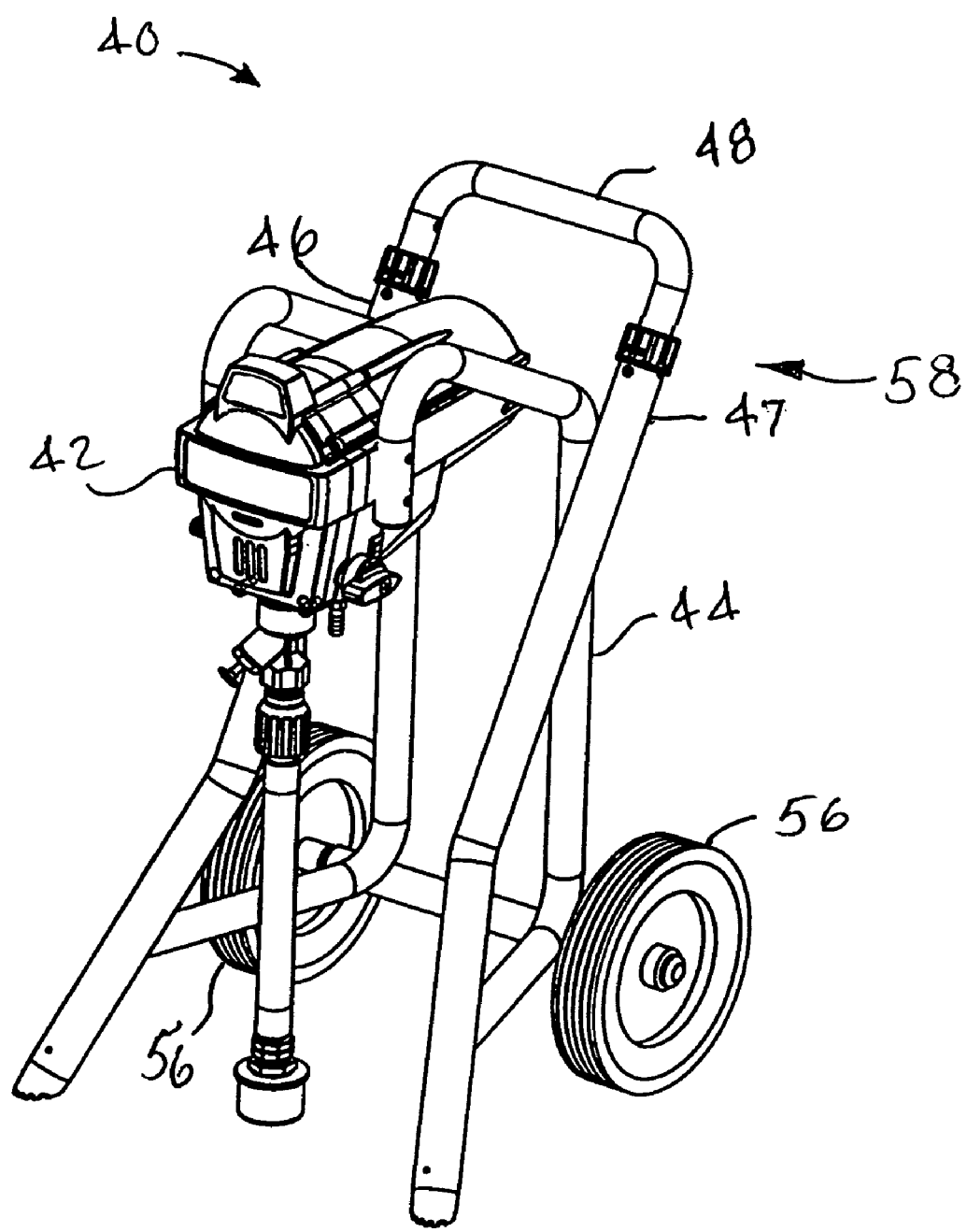
FIG. 2 is a view of the pump and cart assembly of FIG. 1, except with the handle telescoped into the frame of the cart in a storage position.

When it is desired to store or transport assembly 40, the present invention permits extensions 50, 52 handle 48 to be telescoped into standtubes 46, 47, as shown in FIG. 2, which illustrates the assembly in a storage position 58. In the storage position, the overall height of the assembly 40 is substantially reduced, making it more convenient for storage and transportation in confined spaces.

Referring now to FIG. 3, a partially exploded view of the cart 44 without the pump 42 may be seen. In this view a handle subassembly 60 is shown separated from the remainder of cart 44. Right and left tubing feet 62, 64 are press fit into a lower end of respective standtubes 46, 47 to provide supporting surfaces for the cart 44 in addition to wheels 56.

Referring now to FIGS. 4 and 5, various views of the handle subassembly 60 may be seen. Handle subassembly 60 may include the handle 48 and extensions 50, 52 all of which are preferably integrally formed of one piece of steel tubing which may be suitably plated, for example, with chrome plating.

Figure 6:
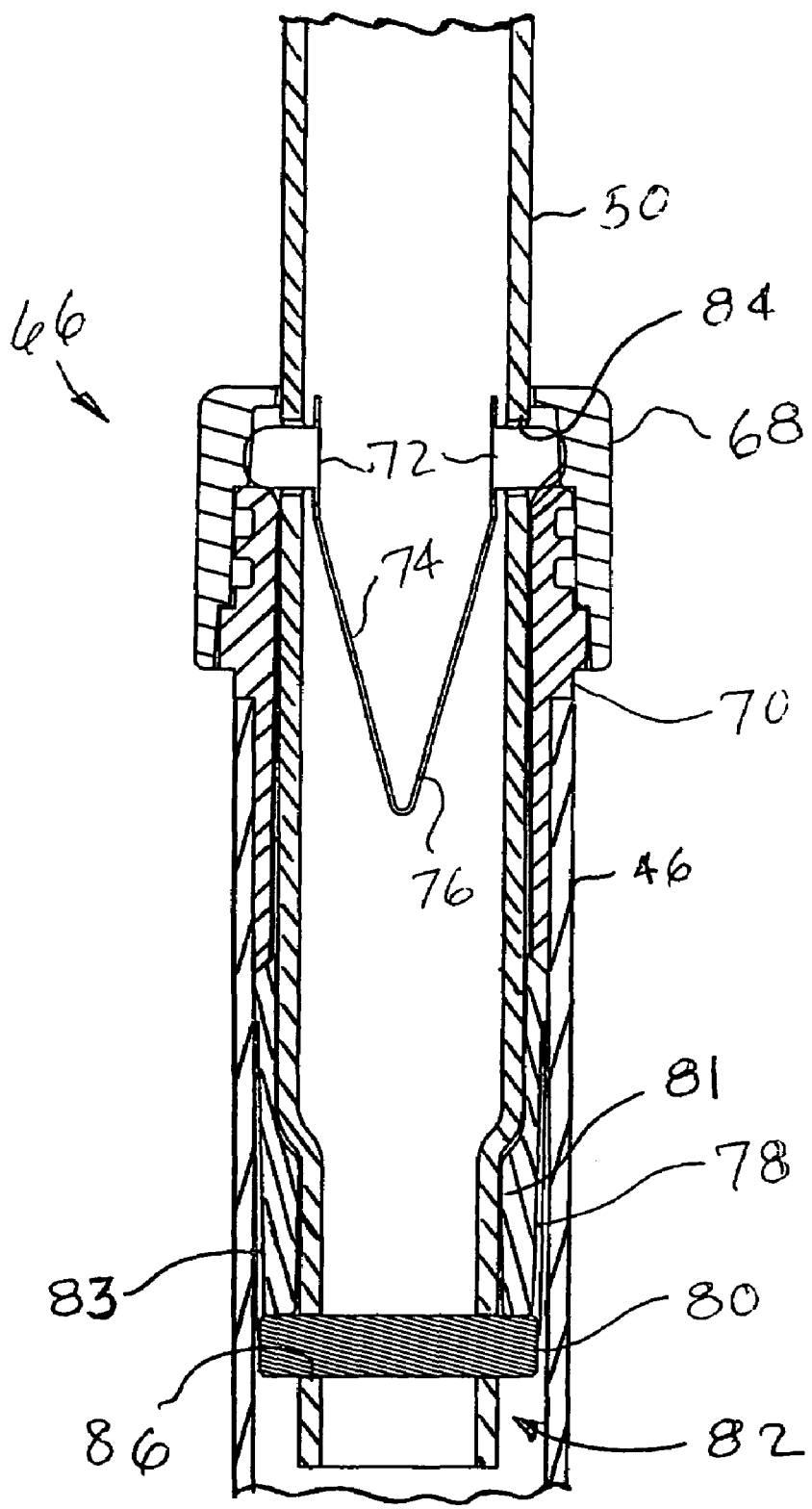
FIG. 6 is an enlarged view of the detail 6 of the handle subassembly of FIG. 5.
Figure 7:
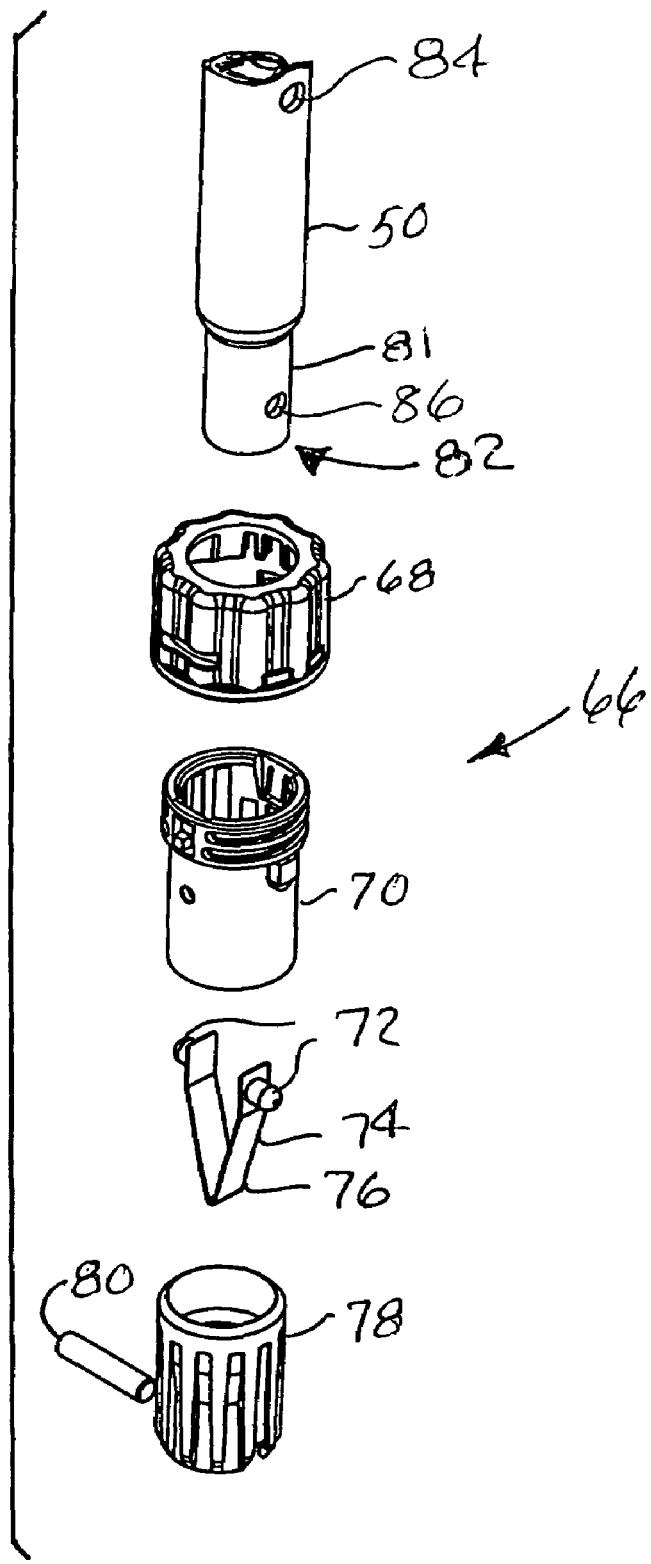
FIG. 7 is an exploded view of the parts shown in FIG. 6.
Figure 25:
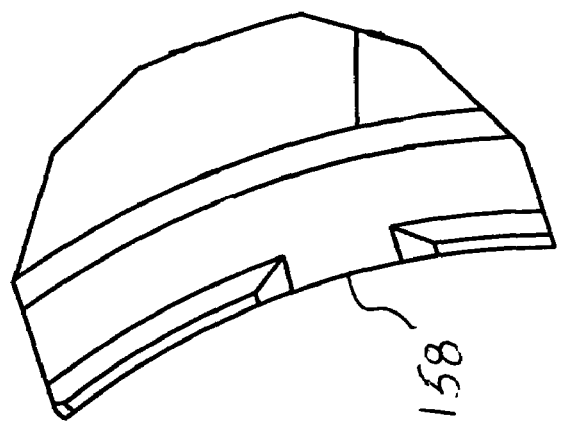
FIG. 25 is an enlarged view of detail 25 of FIG. 24.
Figure 24:
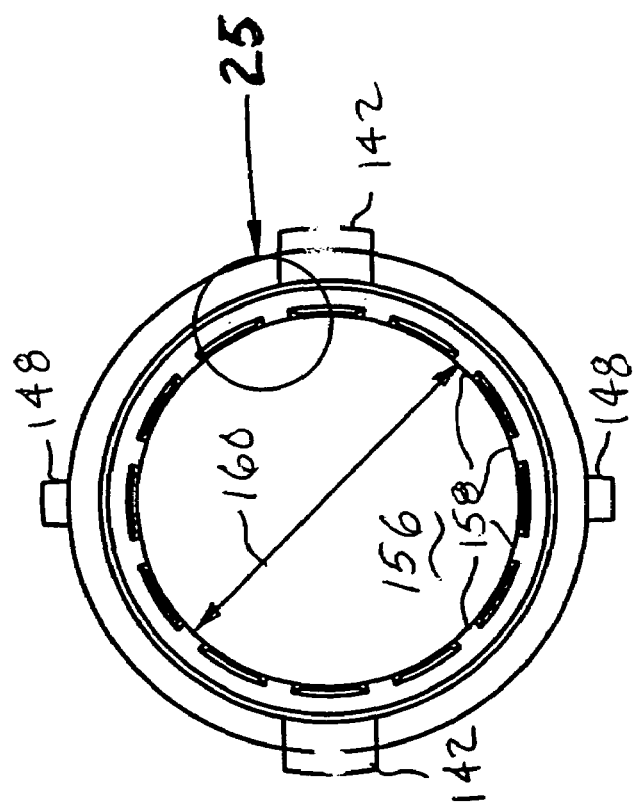
FIG. 24 is a bottom plan view of the standtube bushing of FIG. 20.

Referring now also to FIGS. 6 and 7, detail and exploded views of parts of a locking mechanism 66 may be seen. The locking mechanism 66 preferably includes a standtube knob 68, a standtube bushing 70, a pair of buttons or projections 72 carried by a resilient spring clip 74 as a subassembly 76, a handle bushing 78 and a drive pin 80. One locking mechanism 66 is preferably mounted on an end 82 of handle extensions 50 and 52. Each handle extension 50, 52 has a reduced diameter portion 81 at its end 82 size to receive and provide clearance for a radially thickened portion 83 of handle bushing 78. Each handle extension 50, 52 has a pair of first apertures sized to receive and allow projections 72 to pass through as shown in FIG. 6. The reduced diameter portion 81 of each handle extension 50, 52 has a pair of second apertures sized to receive drive pin 80, also as shown in FIG. 6. Drive pin 80 may be retained by an interference fit with apertures 86 or by an interference fit with bushing 78 or both.

In order to insert subassembly 76 into the handle extension, it may be found desirable to either use a spring clip 74 with a single projection 72, or to insert the subassembly 76 before the reduced diameter portion 81 is formed. The subassembly 76 is fully installed when one or both projections 72 extend through the first apertures 84.

Once the subassembly 76 is installed, the remaining parts of the locking mechanism 66 are installed by assembling knob 68 to bushing 70, then placing the assembled knob 68 and standtube bushing 70 over the handle extension, then placing the handle bushing 78 over the extension and securing it with drive pin 80 through apertures 86. The completely installed locking mechanism 66 is shown together with the standtube bushing 70 received in standtube 46 in FIG. 6, which illustrates parts shown in the locked condition corresponding to the operating position for handle 48, when it is fully extended as shown in FIG. 1.

FIG. 8 shows the locking mechanism 66 in a released condition, with the handle extension 50 partly displaced away from the operating position 54. The locking mechanism 66 remains in a released condition as the handle extension 50 telescopes further into standtube 46 until the handle 48 reaches the storage position, shown in FIG. 2.

Referring now to FIGS. 10–14, various views of the standtube knob 68 may be seen. Knob 68 has a circumferential sidewall 90 with a pair of generally rectangular apertures 92 therethrough and spaced diametrically of each other. The outer surface of sidewall 90 may have ribs or flutes 94 to assist an operator in grasping and rotating the knob 68. Sidewall 90 has a pair of diametrically opposed internal ramps 96, each having a varying radius 98 and each of which is adjacent at one end thereof to one of a pair of constant radius lands 100, which lands are also diametrically opposed to each other. The other end of each ramps 96 ends in a pocket 102. The combination of each adjacent pocket 102, ramp 96 and land 100 makes up an interface surface 104 which cooperates with the subassembly 76 to move the locking mechanism 66 between the locked and unlocked condition in a manner described more fully infra. The interface surfaces 104 are in quadrature, i.e., located at 90 degrees, with respect to the rectangular apertures 92, as may be seen most clearly in FIG. 11. Knob 68 has a top wall 106 with an aperture 108 sized to closely interfit with handle extension 50 or 52. A plurality of ribs 110 may extend part way down along an interior surface of the sidewall 90 to act as guides for handle extension 50 or 52. The interior surface of sidewall 90 also has a pair of diametrically opposed recesses 112, each forming an arcuate ledge 114, also in quadrature with apertures 92. Knob 68 also has a pair of ramps 116 aligned with rectangular apertures 92 to assist in assembling the knob 68 to the standtube bushing 70, as may be seen most clearly in FIGS. 11, 12 and 13. Referring to FIG. 14, the angular span or included angle 118 of each rectangular aperture is preferably 20 degrees.

Referring now to FIGS. 15–19, various views of the handle bushing 78 may be seen. Bushing 78 preferably has a stepped internal bore 120 matching the stepped diameters of handle extension 50, including the reduced diameter portion 81, as may be seen most clearly in FIG. 6. Bushing 78 may have a plurality of longitudinally extending ribs or flutes 122 extending longitudinally along a portion of an exterior of the bushing 78, with a solid ring-like region 124 circumscribing a top of bushing 78, allowing a chamfered surface 126 to extend continuously around the circumference of an upper edge of the bushing 78. Surface 126 preferably has a cone angle 128 of 45 degrees. Bushing 78 also preferably has a pair of diametrically positioned notches 130 at its lower end to receive and mate with the drive pin 80, as shown most clearly in FIG. 6. Handle bushing 78 serves as a cap or cover for handle extensions 50, and also provides a guide or spacer function to concentrically locate each handle extension 50 within its respective standtube 46 or 47. In addition, each handle bushing 78 interacts with a respective stand tube bushing 70 to provide a braking function (described in more detail, infra) for the handle as the handle extensions are withdrawn from the standtubes.

Referring now to FIGS. 20–26, various views of the standtube bushing 70 may be seen. Standtube bushing 70 is generally cylindrical and has a lower portion 132 having a diameter 134 sized to be snugly received in an upper region of the standtube, with an upper portion 136 having a step to a diameter 138 preferably equal to an outside diameter of the standtube. Lower portion 132 preferably has a pair of U-shaped projections 140 adapted to be keyed to corresponding congruent U-shaped recesses or notches in the upper region of the standtube. Each U-shaped projection 140 has a stepped portion 142 with a diameter 144 sized to act as a bearing surface for the recesses 112 of standtube knob 68. Lower portion 132 also preferably has a pair of apertures 146 to receive machine screws to secure the standtube bushing to the standtube in which it is installed. The upper portion 136 of the standtube bushing preferably has a pair of cantilevered teeth 148 located diametrically opposite each other and extending outward beyond the outer surface of the upper portion 136. Teeth 148 are adapted to momentarily deflect when the standtube knob 68 is received over the standtube bushing 70 until each tooth 148 is received in one of the rectangular apertures 92 of the standtube knob 68, after which teeth 148 retain the knob 68 to the bushing 70, while allowing limited rotational movement therebetween. Upper portion 136 of the standtube bushing 70 may also have circumferentially oriented reliefs 150, 152 therein, to provide for an upper bearing surface 154 (to maintain concentricity of standtube knob 68 on bushing 70) while at the same time reducing the mass of the upper portion 136 for molding purposes. Standtube bushing 70 has an internal bore 156 with radially inwardly projecting ribs 158 defining an internal diameter 160 sized to receive handle extension 50, as shown in FIG. 6.

Referring now most particularly to FIG. 26, lower portion 132 of standtube bushing 70 ends in a cone angle 162 equal to the cone angle 128 of the handle bushing 78, preferably 45 degrees. As may be seen most clearly in FIG. 6, when the handle extension 50 is drawn out of the standtube 46, the handle bushing 78 contacts the standtube bushing 70 at an interface of the surfaces having cone angles 128 and 162. Such a contact results in a radial wedging action that acts as a brake to dissipate energy associated with the mass of the handle 48, preventing shearing of parts that might otherwise occur in stopping telescoping movement of the handle as it is withdrawn from the standtubes.

Figure 27:
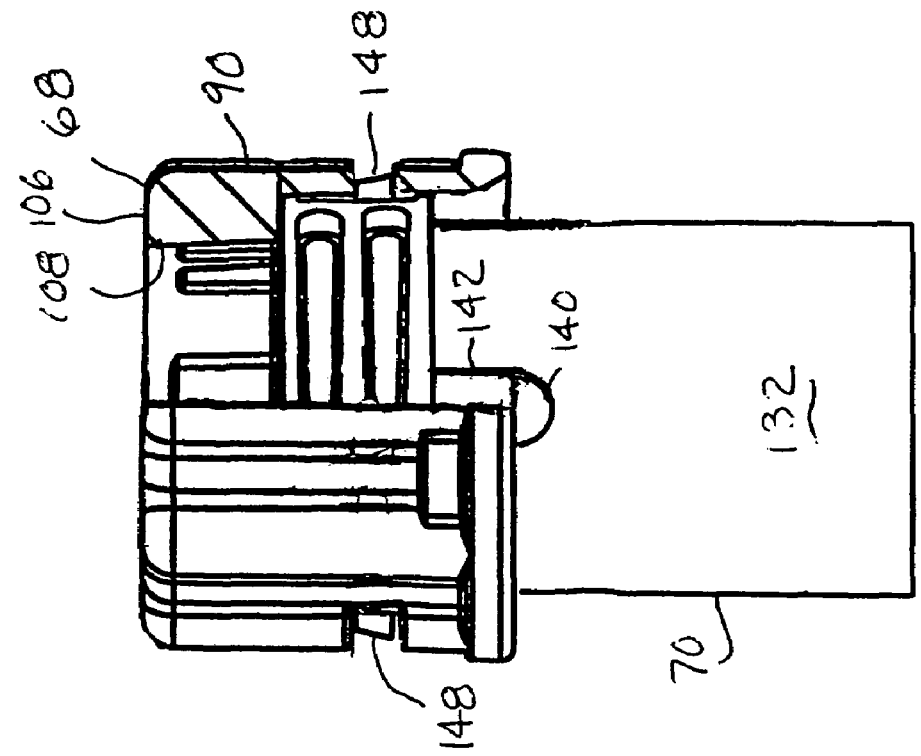
FIG. 27 is a side elevation view of an assembly of the standtube knob in half section corresponding to FIG. 12 and the standtube bushing corresponding to FIG. 20.
Figure 28:
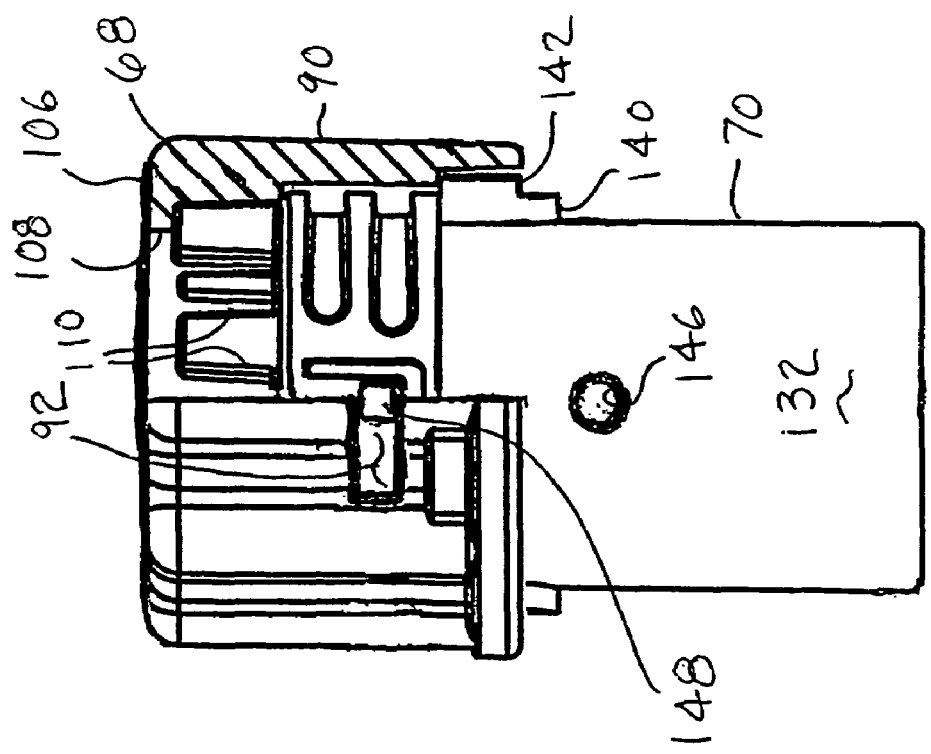
FIG. 28 is a side elevation view of an assembly of the standtube knob in half section corresponding to FIGS. 10 and 13 and the standtube bushing corresponding to FIG. 21.

Referring now to FIGS. 27 and 28, two side elevation views of an assembly of the standtube knob 68 in half section and the standtube bushing 70 may be seen. The knob 68 is received on the standtube bushing 70 and retained thereon by reception of the teeth 148 in respective ones of the rectangular apertures 92. Knob 68 is guided for concentric rotational movement on upper bearing surface 154 of the bushing 70 and also guided on the top surfaces of the stepped portions 142. The circumferential movement is limited by each tooth 148 coming into contact with an end surface of apertures 92. FIGS. 27 and 28 show the knob 68 at an intermediate circumferential position with respect to the bushing 70.

Referring now to FIG. 29, a simplified plan view is shown looking up, with the standtube and standtube bushing omitted for clarity. FIG. 29 shows the bottom view of the standtube knob 68, with the handle extension 50 in section, and shows the detent or spring clip assembly 76 in a locked condition as it would appear with the handle extended out of the standtubes and in the operating position. FIG. 29 corresponds to the position of parts shown in FIG. 6, where each projection 72 extends radially outward beyond the aperture 84 in handle extension 50, and rest on an upper surface of the standtube bushing 70 (see FIG. 6) to lock the handle in the operating position, as shown in FIG. 1. In this locked condition, the standtube knob is circumferentially positioned as shown in FIG. 29, to allow the spring clip 74 to urge the projections 72 through apertures 84. The pockets 102 in the standtube knob 68 are aligned with the projections 72 in this position.

When it is desired to telescope handle 48 into the standtubes 46, 47 for storage, each standtube knob 68 is rotated in the direction indicated by arrow 164 in FIG. 29. As the standtube knob 68 is rotated, projections 72 will be driven radially inward by ramps 96, until the projections are resting against lands 100.

Referring now to FIG. 30, the projections 72 are shown resting against lands 110, in a view similar to that of FIG. 29, except that the standtube knob 68 and the detent clip assembly 76 are now in an unlocked condition. In this condition, the handle extensions 50, 52 may be telescoped into their respective mating standtubes 46, 47, with the handle moving from the operating position 54 shown in FIG. 1, to the storage position 58 shown in FIG. 2. It is to be understood that the handle 50 may be moved from the storage position 58 to the operating position 54 with the standtube knob 68 in any circumferential position; however, the standtube knob 68 must be rotated to the position shown in FIG. 29 for the projections to extend fully radially outward to achieve the locked condition wherein the handle is retained in the operating position 54 and not allowed to collapse or telescope back into the standtubes unless and until the standtube knobs 68 are rotated to the unlocked condition shown in FIG. 30. It is also to be understood that the standtube knobs 68 may be left in any circumferential position when the handle is stored in the standtubes.

This invention is not to be taken as limited to all of the details thereof as modifications and variations thereof may be made without departing from the spirit or scope of the invention.

The invention claimed is:

1. A paint pump cart assembly comprising:
    a) a paint pump frame having at least one upwardly projecting standtube;
    b) a handle having at least one downwardly projecting handle extension received in the standtube;
    c) a standtube knob at an intersection of the standtube and handle extension, the knob having:
        i) at least a limited range of rotational movement with respect to the standtube,
        ii) at least one internal ramp movable with respect to the handle extension;
    d) a standtube bushing supporting and retaining the standtube knob while permitting the rotational movement of the knob with respect to the standtube; and
    e) a resiliently mounted projection located internal to the handle extension and movable between
        i) a locking position wherein the handle extension is maintained in an extended position with respect to the standtube, and
        ii) a released position wherein the handle extension is allowed to telescope into the standtube towards a storage position,
    wherein the internal ramp of the standtube knob moves the resiliently mounted projection between the locking position and the released position in response to the rotational movement of the standtube knob with respect to the standtube.

2. The assembly of claim 1 wherein the standtube knob circumscribes the standtube.

3. The assembly of claim 1 wherein the rotational movement of the standtube knob is limited to a predetermined range.

4. The assembly of claim 1 wherein the at least one internal ramp is a surface having a varying radius.

5. The assembly of claim 4 wherein the standtube knob has at least one circumferential land with a generally constant radius and located adjacent one end of the at least one internal ramp.

6. The assembly of claim 5 wherein the standtube knob has a pocket located adjacent the other end of the at least one internal ramp.

7. The assembly of claim 1 wherein the standtube bushing and standtube knob have mating cylindrical surfaces and one of the standtube bushing and standtube knob has at least one circumferentially extending recess and the other of the standtube bushing and standtube knob has a radially extending projection received in the recess to retain the knob to the bushing while allowing a range of movement between the knob and the bushing.

8. The assembly of claim 7 wherein the handle extension has a handle bushing on the end thereof and the standtube bushing is at least partially received within the standtube and wherein the handle bushing and standtube bushing each have mating conical surfaces moveable into and out of contact with each other when the handle is moved with respect to the standtube such that the mating conical surfaces of the bushings come into contact with each other as the handle is moved from the storage position to the operating position.

* * * * *